April 8, 1930.  T. J. SMULSKI  1,753,758
ROAD INDICATOR
Filed Oct. 11, 1920   5 Sheets-Sheet 1
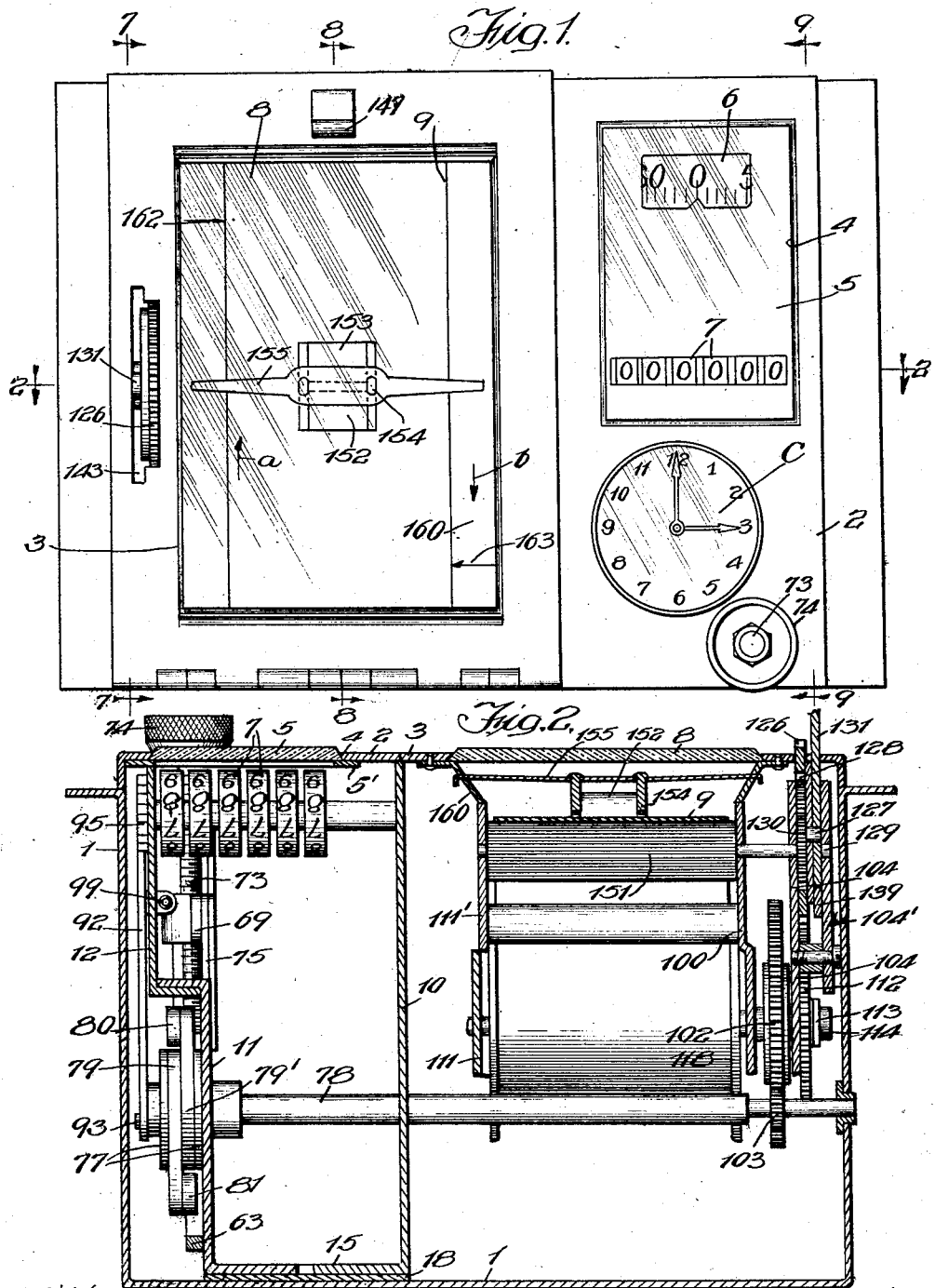

April 8, 1930.  T. J. SMULSKI  1,753,758
ROAD INDICATOR
Filed Oct. 11, 1920   5 Sheets-Sheet 2
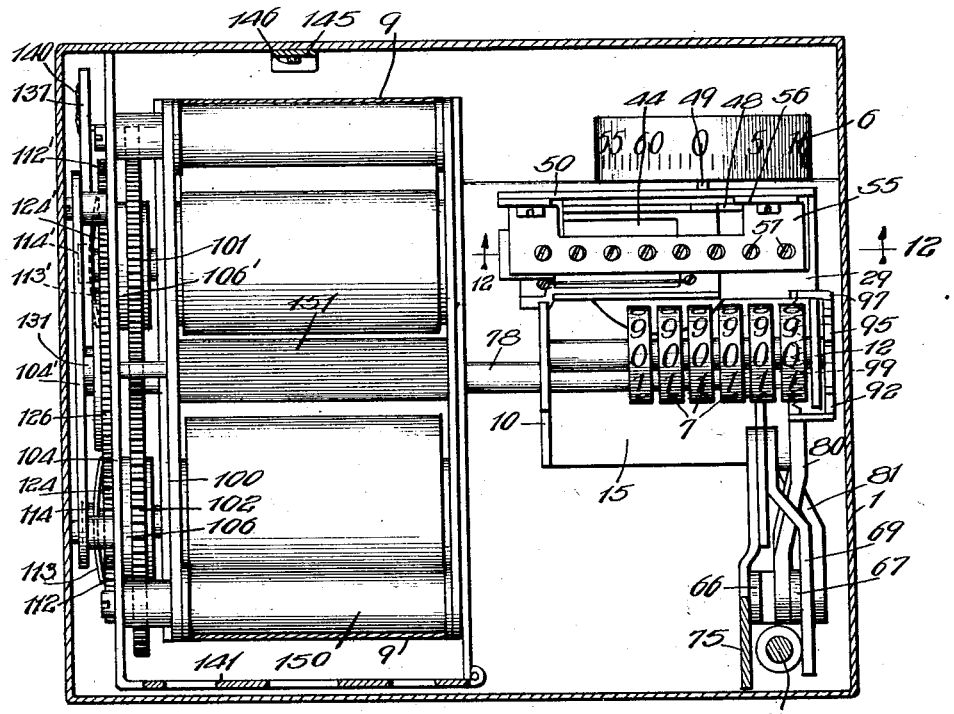

April 8, 1930.  T. J. SMULSKI  1,753,758
ROAD INDICATOR
Filed Oct. 11, 1920  5 Sheets-Sheet 3

Witnesses:
W. F. Kilroy
Harry R. L. White

Inventor:
Theodore J. Smulski,
By Hill & Hill
Attys.

April 8, 1930.  T. J. SMULSKI  1,753,758
ROAD INDICATOR
Filed Oct. 11, 1920   5 Sheets-Sheet 4

Witnesses:
W. F. Kilroy
Harry R. L. White

Inventor:
Theodore J. Smulski,
By Hill & Hill
Attys

April 8, 1930.  T. J. SMULSKI  1,753,758
ROAD INDICATOR
Filed Oct. 11, 1920   5 Sheets-Sheet 5
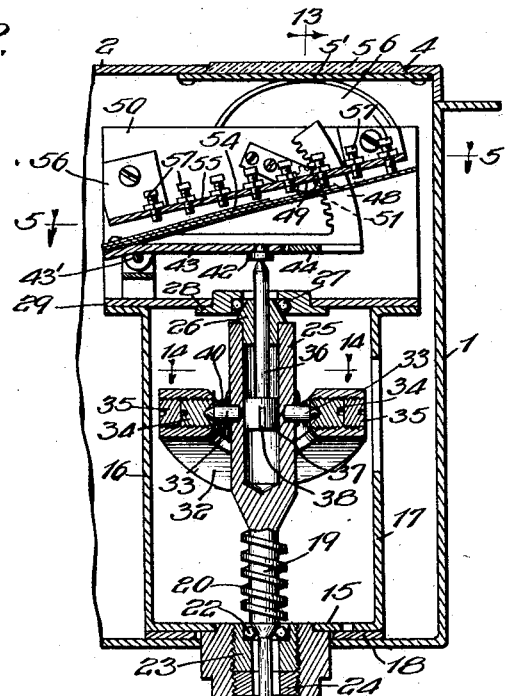
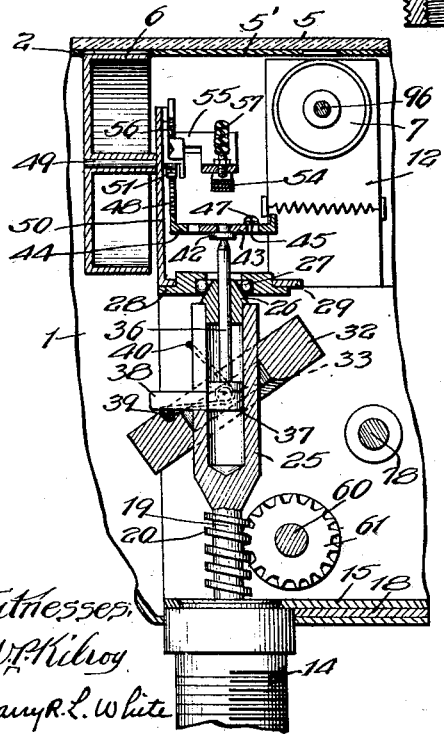
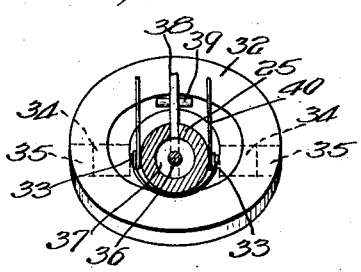
Witnesses:
W. F. Kilroy
Harry R. L. White
Inventor:
Theodore J. Smulski,
By Hill v Hill
Attys Patented Apr. 8, 1930

1,753,758

UNITED STATES PATENT OFFICE

THEODORE J. SMULSKI, OF CHICAGO, ILLINOIS, ASSIGNOR TO THE MILEOMETER COMPANY, OF CHICAGO, ILLINOIS, A CORPORATION OF ILLINOIS

ROAD INDICATOR

Application filed October 11, 1920. Serial No. 416,187.

My invention belongs to that general class of devices employed for indicating routes, measuring and indicating speeds and distances covered by vehicles, and relates particularly to a device adapted for use on automobiles or like vehicles, for indicating a definite course of travel, as well as indicating the rate of speed of the vehicle and the distance traveled. The invention has among its objects the production of a device of the kind described that is simple, convenient, compact, durable, reliable, accurate and attractive, efficient and satisfactory for use wherever found applicable. More particularly it has for an object the production of a device of the kind described which not only operates accurately, but in which the various parts may be adjusted in a simple and reliable manner, whereby the machine always indicates accurately regardless of road or vehicle conditions. Various other improvements, objects and advantages will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a top plan view of my improved device;

Fig. 2 is a sectional view taken substantially on line 2—2 of Fig. 1 turned through an angle of 180 degrees;

Fig. 3 is a sectional view taken substantially on line 3—3 of Fig. 9;

Fig. 4 is a sectional view taken substantially on line 4—4 of Fig. 7;

Fig. 5 is a sectional view taken substantially on line 5—5 of Fig. 12;

Fig. 6 is a sectional view taken substantially on line 6—6 of Fig. 4;

Fig. 9 is a sectional view taken substantially on line 9—9 of Fig. 1;

Fig. 10 is a sectional view taken substantially on line 10—10 of Fig. 9;

Fig. 11 is a sectional view taken substantially on line 11—11 of Fig. 10;

Fig. 12 is a sectional view taken substantially on line 12—12 of Fig. 3;

Fig. 13 is a sectional view taken substantially on line 13—13 of Fig. 12, and

Fig. 14 is a sectional view taken substantially on line 14—14 of Fig. 12.

Figure 7:
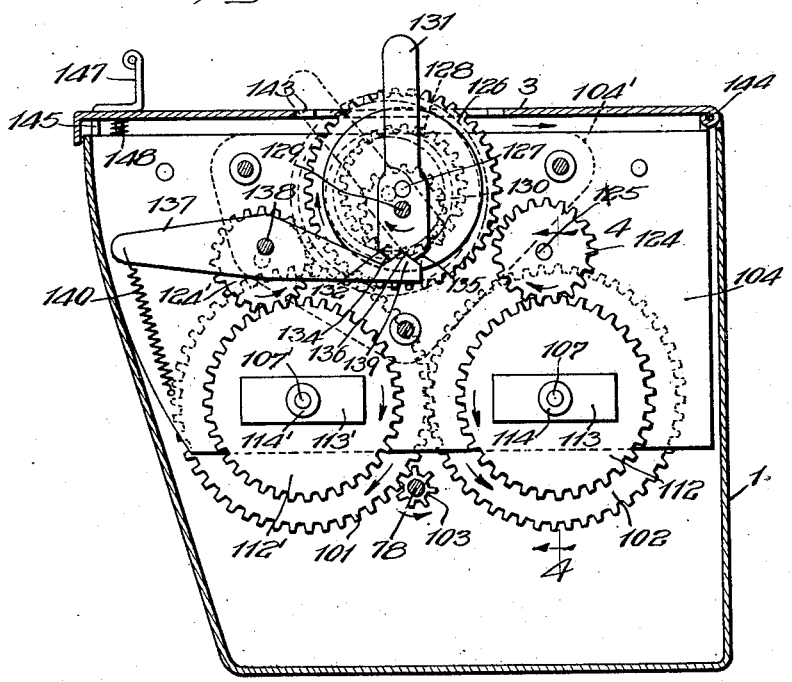
Fig. 7 is a sectional view taken substantially on line 7—7 of Fig. 1 turned through an angle of 90 degrees.

Referring to the drawings, it may be mentioned that in the preferred construction I provide a casing of suitable size, shape and material consisting of the casing part 1 provided with the cover parts or face plates 2 and 3, one of which, as shown cover plate 3, is preferably hinged to the casing, as will be more fully explained hereafter. As most clearly shown in Fig. 1, the speedometer and odometer mechanism is displayed through an opening in the cover plate 2, the opening being preferably covered by a glass plate 5 or the equivalent. The speed is shown on an indicator wheel 6 and the total mileage on the odometer wheels or disks 7. It may be mentioned that a plate 5' is preferably arranged below the glass, the same having a cut-out portion so as to disclose the numerals on the indicator wheels referred to. The route indicating and guiding means is displayed through the cover plate 3. It may be mentioned that 9 represents a tape of suitable size, shape and form, and bearing suitable characters, as will be hereinafter refered to. The casing is mounted on the vehicle in any desired manner, preferably so that the various indicating mechanisms may be clearly seen by the observer.

Arranged at one side of the casing is a tubular member 14, which is arranged between or adjacent the plates 16 and 17, each having the sides flanged as indicated at 15, 18 being a plate arranged between the casing and the flanges 15 and connecting them together, as shown. Arranged within the casing, between the plates 16 and 17, is a shaft member 19 provided with worm gear 20, the shaft member having an extended end 21 projecting into the tubular part 14 and arranged to be attached to a flexible drive shaft or the equivalent, preferably connected with one of the wheels or other moving parts of the vehicle, (not shown). As shown, antifriction or ball bearings 22 are arranged adjacent one end of the shaft, 23 being a bearing member arranged in the tubular part 14, which may be locked in place by a lock member 24 or the equivalent. The opposite end 25 of the shaft 19 is preferably enlarged as shown in Fig. 12, and is tubular, and the same carries a bearing member 26 arranged to cooperate with the ball bearings 27, or their equivalent, arranged between member 26 and plate 28, which in the construction shown, is carried by a plate 29, supported by the frame members 16 and 17.

Arranged on the shaft, as shown, on the enlarged portion 25 thereof, is a governor member 32, which is carried by the studs or pins 33. As shown, the studs engage bearing members 34 at each side of the member 32, 35 being lock members or nuts for preventing the accidental loosening of the members 34. Arranged within the tubular part 25 is a movable rod or pin 36, which is preferably enlarged at the lower end at 37 so as to closely fit the tubular portion of the shaft and be carried therein, the same having a bar or arm 38 projecting to the exterior of the shaft and arranged to engage with the ring 32 on engaging member 39 carried by the ring, as shown in Fig. 13. The rod or pin 36 projects through the bearing member 26, the same being constructed to slide freely therethrough and engage with the member 42 which, in the construction shown, is carried by the arm 43 pivotally supported by a pin or shaft 43', or the equivalent for the purpose. The pin or supporting member 43' also carries a member 44 which is loosely mounted thereon. Members 44 and 43 are preferably flexibly connected so that vibration of one will not be transmitted to the other, and in the construction shown they are connected by means of a wire 45, for example piano wire, which is secured at 46 to the member 44 and at 47 to the member 43. The member 44 is provided with a gear sector or segment 48. The indicator wheel 6 previously referred to, is mounted on a shaft or spindle 49, and is carried by the flange or plate 50, (see Fig. 13), which in the construction shown is formed on plate 29. Arranged on the end of the spindle or shaft 49 is a pinion 51 arranged to mesh with the teeth on the gear sector 48 so that as the member 44 is raised or lowered, motion is transmitted to the indicator wheel. As most clearly shown in Figs. 5, 12 and 13, there is provided a spring 54, which in the construction shown is attached to the arm or member 43. A leaf spring construction is illustrated, it being understood that any suitable type of spring may be employed for the purpose. The spring shown is arranged to cooperate with adjustable members 57 carried by a plate 55, which may be formed with flanges 56 and secured to the side of the plate or flange 50.

The operation of the speedometer mechanism may be briefly described as follows: As the shaft part 21 is driven or rotated by the operation or the travel of the vehicle, the same rotates shaft part 25, and with it the governor member 32. As the speed of the rotating shaft increases, the governor member 32 tends to straighten up and extend transversely the shaft, the springs 40 to a slight extent tending to retard its movement, and it is immediately returned as the speed decreases, toward its normal position. As the member straightens up, as it may be termed, the same cooperating with the arm 38, moves the rod or pin 36, likewise thereby actuating the arm 43, and this through the flexible connection mentioned, tends to actuate member 44 and sector 48, and this through the pinion 51 rotates the indicator wheel 6. The speed of the vehicle is indicated by the indicator wheel, the movement of the same depending upon the speed and movement of the governor member 32. Movement of the members 43 and 44 is retorded or opposed by the engagement of the spring 54 with the members 57. It will be noted that the members 57 may be adjusted as desired, so that the instrument may be calibrated for substantially the various speeds, and thereby register accurately at all speeds of the vehicle.

As before mentioned, I provide the indicator wheels 7 constituting a part of the odometer mechanism, which records and indicates the total mileage. Referring particularly to Figs. 2, 3, 9, 10 and 11, a shaft 60 is provided (see Fig. 13), which carries a gear 61 arranged to mesh with and be driven by the worm 20 on the shaft 19. Shaft 60 carries a member 62 to which is connected a link 63. As shown in Fig. 9, the link 63 is connected at 64 to the disk or member 62, but the same is arranged eccentric or at one side of the shaft 60 so that the disk 62 substantially constitutes a crank, and as shaft 60 is operated, the same actuates the link 63. Link 63 is pivotally connected at 65 to a link 66, which is supported at 66', as shown, from an extending part 75 of the frame portion 10. Link 66 is slotted as indicated at 68. There is also provided a link 69 having one end pivotally secured at 70 to part 75, with the opposite end pivotally secured at 72 to a nut or the equivalent, carried on the threaded rod 73 which projects to the exterior of the casing, and is provided with a knurled knob 74 or equivalent means. The link 67 is pivotally supported at 71 from the link 69. There are provided two links 80 and 81 which are pivotally secured to the links 66 and 67 at 82, the construction being such that the pin 82 extends through the slot in link 66, but is supported by the link 67 so that as link 69 is partially rotated about the axis 70, pin 82 will move in the slot, and the distance of the pin 82 from the pivotal connection 66' of the link 66 may be varied as desired, for purposes hereinafter described. There is also provided a shaft 78, which shaft, in the construction shown, is arranged to control or actuate the odometer or indicator wheels 7, as well as the route guiding means or the tape. The preferred connecting mechanism between the odometer wheels and the tape mechanism is such that the rocking back and forth of the link 66 causes these mechanisms to be driven. Mounted on the shaft 78 is a sleeve 87, (see Figs. 10 and 11). Carried by the sleeve are arms 79 and 79', which are operatively connected to the sleeve through suitable clutch mechanism, it being understood that any clutch mechanism suitable for the purpose may be employed. As shown, members 77 are arranged on the sleeve, the same having hub flanges 77' extending between the sleeve and the arms 79 and 79'. Arm 79 and link 81 are pivotally secured together at 84, and link 80 and arm 79' are pivotally secured together at 84'. I have shown each of the arms provided with notches 88, and arranged clutch members 89 between the sleeve 87 and the arms 79 and 79'. There are also provided springs 85 or the equivalent, which are secured as at 85' to their respective disks. The purpose of the springs is to maintain the arms 79 and 79' in such relation with the members 77 as to keep the clutch members 89 substantially in the positions indicated in Fig. 11. As link 81 moves in the direction indicated by the arrow in Fig. 9, the same moves arm 79 in the direction indicated by the arrow in Fig. 11, and its movement is transmitted through the clutch members to the sleeve 87, causing that to be rotated in the direction indicated by the arrow in Fig. 11. At the same time link 80 is moved in the direction indicated by the arrow on link 81, arm 79' is moved in the opposite direction to the arm 79, but at this time the clutch is inactive, and no movement of link 80 is transmitted to the sleeve 87. On the return movement of the link 66, however, link 80 becomes the operative link, and through the clutch mechanisms similar to that described, rotates sleeve 87 in the direction indicated by the arrow in Fig. 11, while arm 79 is rocked back in the opposite direction to that indicated by the arrow in Fig. 11, but at this time the clutch is inactive, and its movement is not transmitted to the sleeve. It will be seen as the link 66 swings back and forth, when actuated by link 63, sleeve 87 is rotated continuously in the direction indicated by the arrow shown in Fig. 11.

Connected with the sleeve 87 is a link 92, the same being secured to the sleeve by a pin 93 or the equivalent, but at one side of the center of the shaft 78 so that the same is eccentric therewith, and the end of the sleeve serves as a crank. Link 92 is arranged at its end 94 to cooperate with and actuate a ratchet wheel 95, mounted on shaft 96, which is arranged to actuate the odometer wheels or indicators 7. A pawl 97, which is shown supported at 98, prevents backward movement of the ratchet wheel, and a spring 99 or equivalent means maintains the pawl 97 and the end 94 of link 92 in engagement with the ratchet wheel. Obviously, as shaft 78 and sleeve 87 are rotated, motion is transmitted through the link 92 to the ratchet wheel 95, causing the shaft 96 to be rotated. I have not considered it necessary to describe or illustrate in detail the connection between the shaft 96 and the wheels 7, as any construction well-known in the art may be employed, the same being preferably such that when one indicator wheel makes a complete revolution, the next higher or adjacent one will be moved a step, for example 1/10 of a complete rotation, and when the next higher one has made a complete rotation, it will have moved the next adjacent or higher one up one step, etc. I have not illustrated trip indicator wheels as a part of the odometer mechanism, but additional odometer or indicator wheels similar to 7 may be added and operatively connected with the shaft 96 or associated mechanism. However, in my preferred construction, the mileometer tape having the mileage or the trip delineated thereon, serves as a trip odometer.

As was before mentioned, there is provided a tape 9, and on this tape is delineated the route to be followed, together with certain other data such as, for example, land marks, where turns are to be made, where caution is to be exercised, where bridges and railroads are to be crossed, where garage and hotel accommodations may be obtained, as well as points of interest along the road, and such other matter as may be desired to be brought to the attention of the automobilist or vehicle occupant as the vehicle progresses, the tape being advanced so that it is at all times before the driver with specific directions covering his trip. The tape, as before mentioned, is displayed in back of the glass cover plate 8, which keeps the dust out and protects the tape. Before describing the various mechanisms for controlling the tape, it may be mentioned that the tape is preferably provided on a spool and is wound from one spool to another, and may have the return trip also shown on the same so that by shifting the mechanism it may be fed back in the opposite direction for the return trip. This, however, depends upon the particular tape used, and which end of the tape is at the outer face of the spool, the mechanism being adapted to actuate the tape in either direction, and on to or from either spool. The tape-feeding mechanism, as before mentioned, is driven from the shaft 78. Referring particularly to Figs. 2, 3, 4, 6, 7 and 8, there is provided a frame 104, 104′, 100 and 111 mounted on frame part 141, which frame carries the tape-feeding mechanism. Carried by this frame are the two tubular shafts 105 upon which are mounted gears 101 and 102 arranged to mesh with the pinion 103, carried and driven by shaft 78. In describing the mechanism, I shall describe the mechanism cooperating with and driven by gear 102, which is arranged to drive the tape in one direction, the similar parts of the mechanism for driving the tape in the other direction and driven by the gear 101, I will designate by the same reference characters primed. Referring particularly to Fig. 7, gear 103 drives gear 101, and this drives gear 102. These two gears rotate at all times that the shaft 78 is rotating. Referring to Fig. 4, gear 102 is mounted on the tubular shaft 105, but is connected therewith through a clutch mechanism consisting of parts 106 and 108, preferably flanged as at 106′—108′, and clutch members 109 substantially similar to that shown in Figs. 10 and 11 and previously described. In this case, however, there is no rocking or reciprocation, as gear 102 rotates substantially continuously except, however, it corresponds with the slightly intermittent rotation of shaft 78, as was heretofore mentioned. The clutch arranged is such that when the gear 102 is driven in the direction indicated by the arrow as shown in Fig. 7, sleeve 105 is rotated in the same direction. Mounted on the tubular shaft 105 is a gear 112, which is driven by the shaft 105, and which drives the tape-feeding mechanism, as will be hereinafter described.

As most clearly shown in Fig. 4, there is provided a shaft 107 which extends through the tubular shaft 105, which is provided with a spool-supporting end 107′, which extends across the machine and carries the spool upon which the tape is wound. The shaft 107, however, is frictionally or yieldingly driven, and in the construction shown, a spring 113 bearing against the gear 112 transmits movement to the head 114 and shaft 107, thereby moving the spool supporting shaft 107′. While any type of spool for carrying the tape may be employed, that shown comprises a central core member 117 provided with end plates 118, which are preferably recessed or offset inwardly at the center, as shown, so as to provide a support for the part 117. The parts 117 and 118 may be secured together in any suitable manner; in the construction shown, portions 119 of the part 117 are bent inwardly so as to retain the spool ends in place on the core, forming a unitary structure. I have illustrated a spool engaging member 116, which is of a size to fit in the recess in the adjacent end of the spool and also engages between the projecting parts 119 (see Fig. 6). In Fig. 4 I have illustrated a ball 121 arranged in a recess 120 of the shaft 107′, the same being normally maintained in the position shown by a spring 122. This construction yieldingly locks the spool on spindle 107′. Obviously, any equivalent construction may be employed if desired. Arranged to engage with the gears 112 and 112′ are gears 124 and 124′, which are mounted on the shafts 125. Arranged to cooperate with either one of these gears at will, or to be out of engagement with both, is the gear 126 which is mounted on the shaft 127. Gear 126 is provided with internal teeth 128, arranged to mesh with the gear 130 on shaft 129, which shaft is arranged to drive the feed roll 151, as will be hereinafter described. As shown, shaft 129 carries an arm 131, which carries the shaft 127. In Fig. 7 the lever 131 is shown in neutral position, so that the gear 126 is out of engagement with both of the gears 124 and 124′. When the same is moved, for example, as indicated in the dotted lines, gear 126 will engage with the gear 124′, which is driven by the gear 112′. As shown, the lever 131 is provided with an extending end formed with the faces 134, 135 and 136. Arranged on the frame is a lever or arm 137, which is pivotally supported at 138 and carries a part 139, arranged to engage with one of the faces mentioned, and maintain the lever 131 in the desired position. Lever 137 is controlled by a spring 140 or equivalent means. As most clearly shown in Fig. 7, the cover plate 3 is provided with a slot 143 through which the lever 131 and gear 126 project. The cover 3 and frame are hinged to the casing at 144 so that the cover may be opened or the mileometer tape-feeding mechanism may be withdrawn for example, for changing or removing empty spools or tape. I have shown locking mechanism for the cover consisting of member 145 arranged to engage with the pin 146 on the casing, the lock being provided with the part 147 extending to the exterior of the casing above the cover. Normally, the locking member is maintained by the spring 148 or equivalent, as shown in Fig. 8.

Arranged within the casing are two guide rolls 150, 150′ over which the tape 9 is extended from the spools. As shown in Fig. 8, the tape extends from one spool over the guide roll, and thence past the feeding-roll 151, and thence over the other guiding roll to the other spool. Arranged to cooperate with the feeding-roll 151, which in the preferred construction is knurled or grooved so as to increase the engagement with the tape which may be of paper, linen, or any other suitable material, are rollers 152, preferably rubber faced, which in the construction shown are arranged on shafts or pins 153, carried by the parts 154 and mounted on a bar 155 which is preferably resilient. This bar is carried by the side pieces 160 of the frame. However, the bar may be easily removed when it is desired to remove the rolls 152, as these rolls are preferably of rubber, and it is sometimes desirable to renew the same. It will be particularly noted by referring to Fig. 8 that the two rolls 152 so maintain the tape on the roll 151 that the same cover a considerable portion of the face of the roller 151, thereby affording a good grip and a positive and non-slipping feeding of the tape. It will be noted also that if there is a tendency for the tape to lift either or both of the rolls 152, nevertheless, the traction or engagement of the tape with the roll 151 is increased, although the area of contact may be less. This is of importance, as should one of the spools drag or tend to operate so as to increase the tension on the tape, there will still be no slipping of the tape on the feed roll. I have shown indicating marks 162 and 163, these being arranged to cooperate with the tape and indicate the point at which the reading is to be made. For example, one mark, 162, would be employed when the tape is traveling in the direction indicated by the arrow thereon, that is, also as indicated by the arrow marked $a$, the other side marked 163 would indicate the point of reading when the tape was traveling in the direction indicated by the arrow marked $b$. This permits the same tape to be employed both for the trip and return. It will be particularly noted that there is displayed a considerable portion of the advancing tape so that it is possible for the driver to see what the road is to be for a considerable distance in advance.

The operation of the mileometer mechanism may be briefly described as follows: As the vehicle is in operation, shaft 78 is driven continuously, as previously described, by means of the arms 80 and 81 and intermediate connecting mechanism actuated from the shaft 19, as described. Assuming that the lever 131 is substantially in the position indicated in Fig. 7, or that is neutral position, and out of engagement with the gears 124 and 124', shaft 78 drives gear 101, which drives gear 102, thereby driving tubular shafts 105, gears 112, 112', 124 and 124'. However, gear 126 being out of mesh with the two gears referred to, there is no driving of the feed roll 151. At the same time the friction clutch mechanism, including the resilient member 113, tends to drive shafts 107, 107', but the tape not being fed by roll 151 and the pull being on each end of the tape, the spools are not driven as the clutch members 113 slip on the gears.

Figure 8:
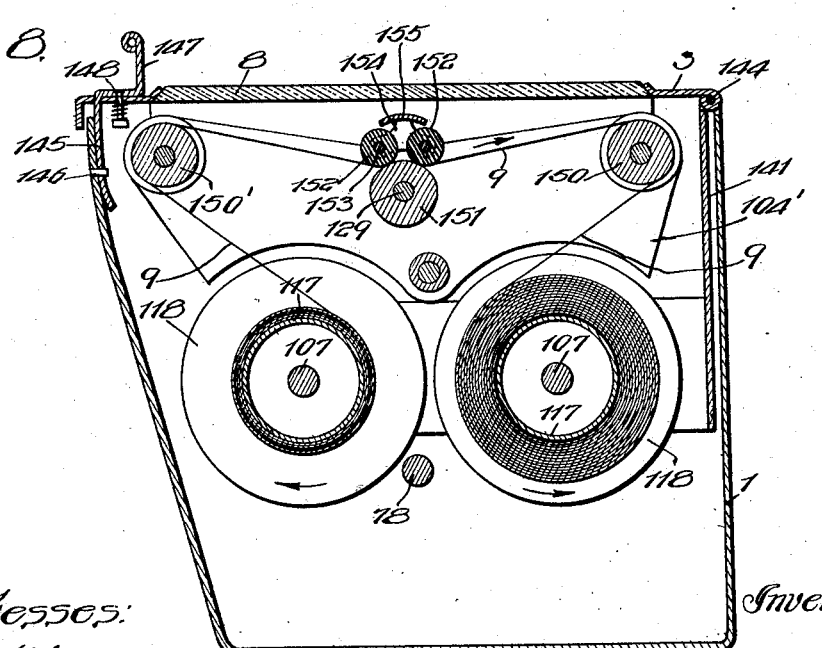
Fig. 8 is a sectional view taken substantially on line 8—8 of Fig. 1 turned through an angle of 90 degrees.

It may be next assumed that the lever 131 is thrown to the dotted position indicated by Fig. 7, and as a result gear 126 meshes with gear 124', consequently gear 126 is driven and thereby drives gear 130, actuating the roll 151, causing the tape to be fed as indicated by the arrow $b$ in Fig. 1, as well as Fig. 8. At the same time the tape as it moves is drawn onto the spool 117 shown in Fig. 8, which spool is being driven through the clutch mechanism previously referred to. However, the clutch mechanism on the opposite spool tends to rotate the spool in winding position, and against the travel of the tape, which is being drawn through the machine by the roll 151 so that the clutch mechanism for this spool slips, thereby permitting the unreeling of the tape from the spool, but at the same time maintaining the same taut or under tension. If it is desired to run the tape in the opposite direction, lever 131 is moved to the opposite position to bring gear 126 in mesh with the gear 124 so that roll 151 is thereby rotated in the opposite direction. However, in this instance, the opposite spool winds the tape on, and the other spool, which as previously described is driven through the clutch mechanism, slips, permitting the unwinding of the tape therefrom.

It will be noted that the tape may be easily manipulated and moved forward or back when the lever 131 is in neutral position, by suitably moving the gear 126 or the equivalent by the fingers or by suitable mechanism provided for the purpose. This is a desirable feature, as the tape may be always easily shifted so as to bring a known land mark referred to on the tape at the desired point to be displayed when the machine is at the point where said land mark should be indicated. This is particularly convenient in case of detours or the like. I have not considered it necessary to illustrate or describe the tape in detail, as any tape or the like indicating chart or map, as it may be termed, may be employed for the purpose.

It will be particularly noted that with the construction herein shown and described, the speedometer, odometer and mileometer operate in conjunction or unison. Consequently there is a cooperation of the parts at all times, and all the parts synchronize. It will also be noted that the mechanisms are all so constructed that the device may be calibrated and at all times remain accurate. The calibration of the odometer and mileometer may be for different sized wheels, for different sized tires, for various tire inflation pressures, and for different road conditions, all of said calibrations or adjustments being made without leaving the seat of the vehicle. The mileometer and odometer may be adjusted without opening the instrument and in but an instant's time.

When it is desired to change the spools and replace the tape, cover 3 is opened and frame 130

104, which is hinged at 144, turned outwardly or opened, thereby displaying both spools. By swinging over plate 3 the spools may be slipped off or interchanged or replaced, the free end of the new tape being extended over the rolls 150 and secured to the empty spool by inserting the end through the slot and giving the same a turn or two. The device is particularly compact. If desired, a clock C may be provided in the instrument so that a single installation on a vehicle covers speedometer, odometer, mileometer and clock, the various instruments operating in conjunction and permitting a check of one against the other at all times.

Having thus described my invention, it is obvious that various immaterial modifications may be made in the same without departing from the spirit of my invention; hence I do not wish to be understood as limiting myslef to the exact form, construction, arrangement and combinaton of parts herein shown and described or uses mentioned.

What I claim as new and desire to secure by Letters Patent is:

1. In a road indicator of the kind described and in combination, a casing provided with a hinged cover plate and having an opening therethrough for the display of a tape arranged within the casing, a frame arranged within the casing and movable in or out of the same as desired, a plurality of spool supports carried by the said frame, a tape, spools arranged on said supports and carrying said tape, means for yieldingly and continuously urging said spool supports to rotate in opposite directions, means for detachably maintaining said spools on said supports, means carried by said frame for feeding the tape through the machine from one spool to the other, and mechanism for driving said spool supports and feeding mechanism in a desired manner.

2. In a road indicator of the kind described and in combination, a casing provided with a movable cover plate and having an opening therethrough for the display of a tape arranged within the casing, a frame arranged within the casing and movable in or out of the same as desired, a plurality of rotatable spool supports, spools arranged on said supports and carrying said tape, means for yieldingly and continuously urging said spool supports to rotate in opposite directions, means for maintaining said spools on said supports, means carried by said frame for feeding the tape through the machine from one spool to the other, mechanism for driving said spool supports and feeding mechanism in a desired manner, and means for varying the operation of the said driving mechanism to accelerate or retard the feeding of the tape as desired.

3. In a road indicator of the kind described and in combination, a casing, a frame arranged within the casing and movable in or out of the same as desired, a plurality of spool supports, a tape, spools arranged on said supports and carrying said tape, means for yieldingly urging said spool supports to rotate in opposite directions to maintain the tape taut, means for securing said spools on said supports, means for feeding the tape from either spool to the other as desired without interchanging the spools, and adjustable mechanism including means extending to the exterior of the casing for driving said feeding means in a desired manner.

4. In a route indicator of the kind described, a casing provided with a hinged cover plate with an opening therethrough, a frame arranged within the casing and movable in or out of the same when said cover plate is in open position, a tape carrying mechanism carried by said frame comprising a plurality of spool supports, spools on said supports, means for yieldingly and continuously tending to rotate said spool supports in opposite directions, a tape feeding mechanism arranged to engage and move the tape whereby the same is transferred from one spool to the other, and means for controlling said feeding means whereby the said mechanism may be actuated to drive the tape in either direction or be inoperative at will, mechanism for driving said spool supports and feeding mechanism including a main shaft arranged within the casing, gearing carried by said movable frame and arranged to transmit movement from said shaft to said spool supports and mechanism, and means for controlling the operation of said shaft whereby the tape feeding mechanism may be calibrated to feed the tape in a predetermined manner.

5. In a route indicator of the kind described, a casing provided with a cover plate having an opening therethrough, a frame arranged within the casing and movable in or out of the same when said cover plate is in open position, a tape carrying mechanism carried by said frame comprising a plurality of spool supports, spools on said supports, means for rotating said spool supports, said last mentioned means continuously urging said spool supports to rotate in opposite directions, a tape feeding mechanism arranged to engage and move the tape whereby the same is transferred from one spool to the other, means for controlling said feeding means whereby the said mechanism may be actuated to drive the tape at will, mechanism for driving said spool supports and feeding mechanism including a main shaft arranged within the casing, gearing carried by said movable frame and arranged to transmit movement from said shaft to said spool supports and feeding mechanism, and adjustable means for controlling the actuation of said shaft whereby the tape feeding mechanism may be calibrated to feed the tape at a predetermined speed and accelerate or retard the feeding of the tape.

6. In a route indicator of the kind described, a casing, a frame arranged within the casing and movable in or out of the same, means for securing the frame within the casing, a tape feeding mechanism carried by said frame comprising a plurality of spool supports, spools carried thereby, and a tape arranged on said spools, continuously operable means for yieldingly tending to rotate said spool supports in opposite directions, a tape feeding mechanism arranged to engage and move the tape whereby the same is transferred from one spool to the other, means for controlling said feeding means whereby the said mechanism may be actuated to drive the tape in a desired direction or be inoperative at will, mechanism for driving said spool supports and feeding mechanism including a main shaft arranged within the casing, gearing carried by said movable frame and arranged to transmit movement from said shaft to said spool supports and mechanism, means for actuating said shaft, and means for controlling said actuating means whereby the tape feeding mechanism may be actuated in a manner to feed the tape as desired.

7. In a road indicator of the kind described and in combination, a casing provided with a hinged cover plate having an opening therethrough for the display of a tape arranged within the casing, a frame arranged within the casing so as to be movable into and out of the same, a tape feeding mechanism carried by said frame, a plurality of spool supports also carried by said frame, mechanism for continuously and yieldingly urging said spool supports to rotate in opposite directions and for driving the feeding mechanism in a predetermined manner, and means projecting from the casing for controlling the driving mechanism.

In testimony whereof, I have hereunto signed my name.

THEODORE J. SMULSKI.